United States Patent
Duncan et al.

(10) Patent No.: US 9,322,495 B2
(45) Date of Patent: Apr. 26, 2016

(54) CONNECTION FOR A THERMOPLASTIC PIPE, ASSEMBLY AND METHOD

(71) Applicant: FLEXPIPE SYSTEMS INC., Calgary (CA)

(72) Inventors: Mark Duncan, Calgary (CA); Jeffrey Ryan Conley, Calgary (CA); Hao Niu, Calgary (CA); Samuel Glen Bouey, Calgary (CA)

(73) Assignee: SHAWCOR LTD. SHAWCOR LTÉE, Toronto (CA)

( * ) Notice: Subject to any disclaimer, the term of this patent is extended or adjusted under 35 U.S.C. 154(b) by 356 days.

(21) Appl. No.: 13/679,794

(22) Filed: Nov. 16, 2012

(65) Prior Publication Data

US 2013/0134700 A1    May 30, 2013

Related U.S. Application Data

(60) Provisional application No. 61/560,599, filed on Nov. 16, 2011, provisional application No. 61/652,298, filed on May 28, 2012.

(51) Int. Cl.
| | |
|---|---|
| *F16L 13/02* | (2006.01) |
| *B29C 65/34* | (2006.01) |
| *F16L 11/08* | (2006.01) |
| *F16L 47/03* | (2006.01) |
| *B29C 65/82* | (2006.01) |
| *B29C 65/00* | (2006.01) |

(52) U.S. Cl.
CPC ........... *F16L 13/0254* (2013.01); *B29C 65/342* (2013.01); *B29C 65/3404* (2013.01); *B29C 65/3432* (2013.01); *B29C 65/3476* (2013.01); *B29C 65/8246* (2013.01); *B29C 66/1122* (2013.01); *B29C 66/1222* (2013.01); *B29C 66/1224* (2013.01); *B29C 66/12441* (2013.01); *B29C 66/5221* (2013.01); *B29C 66/5229* (2013.01); *B29C 66/52291* (2013.01); *B29C 66/52293* (2013.01); *B29C 66/52296* (2013.01);
(Continued)

(58) Field of Classification Search
CPC .................................. F16L 47/02; F16L 47/03
USPC ........................................................ 285/21.2
See application file for complete search history.

(56) References Cited

U.S. PATENT DOCUMENTS 2,810,424 A   10/1957  Swartswelter et al.
2,815,043 A   12/1957  Kleiner et al.
(Continued)

FOREIGN PATENT DOCUMENTS

CA    2513506 A1   8/2004
CA    2753024 A1   9/2010
(Continued)

OTHER PUBLICATIONS

A. G. Gibson, FRC '98, Consolidating New Applications, Seventh International Conference on Reinforced Composites, Conference Proceedings, Apr. 15-17, 1998, University of Houston Libraries.
Supplementary European Search Report for EP12850505; Jul. 3, 2015, Munich.

*Primary Examiner* — David E Bochna
(74) *Attorney, Agent, or Firm* — Bennett Jones LLP

(57) ABSTRACT

A pipe coupling for forming a pipe connection includes: a wall formed as a tube and including an inner surface defining an inner diameter and an outer surface; an electrical conductor supported by the wall and extending about a circumference of the coupling; and a pair of contacts exposed on the outer surface and electrically in contact with the electrical conductor for connecting an electrical power source to the electrical conductor.

42 Claims, 6 Drawing Sheets

(52) U.S. Cl.
CPC ......... *B29C 66/52298* (2013.01); *B29C 66/636* (2013.01); *B29C 66/721* (2013.01); *B29C 66/723* (2013.01); *B29C 66/73921* (2013.01); *B29C 66/8286* (2013.01); *F16L 11/082* (2013.01); *F16L 11/083* (2013.01); *F16L 47/03* (2013.01); *B29C 65/3444* (2013.01); *B29C 65/3468* (2013.01); *B29C 66/71* (2013.01); *B29C 66/7212* (2013.01); *B29C 66/72141* (2013.01); *B29C 66/7315* (2013.01); *B29K 2995/0086* (2013.01); *B29K 2995/0089* (2013.01)

(56) References Cited

U.S. PATENT DOCUMENTS

| | | | |
|---|---|---|---|
| 3,117,597 A | | 1/1964 | Fritz et al. |
| 3,235,289 A | * | 2/1966 | Jones ............................ 285/21.2 |
| 3,481,369 A | | 12/1969 | Ganahl |
| 3,536,104 A | | 10/1970 | Lejeune |
| 3,604,461 A | | 9/1971 | Matthews |
| 3,905,398 A | | 9/1975 | Johansen et al. |
| 3,948,292 A | | 4/1976 | Goto et al. |
| RE29,112 E | | 1/1977 | Carter |
| 4,023,835 A | | 5/1977 | Ewing et al. |
| 4,081,302 A | | 3/1978 | Drostholm et al. |
| 4,147,381 A | * | 4/1979 | Schwarz ............................ 285/53 |
| 4,173,670 A | | 11/1979 | VanAuken |
| 4,224,505 A | * | 9/1980 | Sturm ............................ 285/21.2 |
| 4,248,062 A | | 2/1981 | McLain et al. |
| 4,257,630 A | * | 3/1981 | Bartell et al. ................. 285/21.2 |
| 4,273,160 A | | 6/1981 | Lowles |
| 4,299,082 A | | 11/1981 | Tarantola |
| 4,343,333 A | | 8/1982 | Keister |
| 4,347,090 A | | 8/1982 | Anderson et al. |
| 4,384,595 A | | 5/1983 | Washkewicz et al. |
| 4,431,034 A | | 2/1984 | Abdullaev et al. |
| 4,437,616 A | | 3/1984 | Magarian et al. |
| 4,504,086 A | | 3/1985 | Carrow |
| 4,514,244 A | | 4/1985 | Shaefer et al. |
| 4,515,737 A | | 5/1985 | Karino et al. |
| 4,601,496 A | | 7/1986 | Ulrich et al. |
| RE32,230 E | | 8/1986 | Satoh et al. |
| 4,676,276 A | | 6/1987 | Fawley |
| 4,718,698 A | | 1/1988 | Hill |
| 4,770,442 A | | 9/1988 | Sichler |
| 4,818,318 A | | 4/1989 | McMahon et al. |
| 4,850,395 A | | 7/1989 | Briggs |
| 4,860,798 A | | 8/1989 | Kovacs et al. |
| 4,898,212 A | | 2/1990 | Searfoss et al. |
| 4,927,184 A | * | 5/1990 | Bourjot et al. ................. 285/21.1 |
| 5,024,252 A | | 6/1991 | Ochsner |
| 5,052,444 A | | 10/1991 | Messerly et al. |
| 5,108,135 A | | 4/1992 | Mercado |
| 5,125,690 A | | 6/1992 | Taylor et al. |
| 5,127,116 A | * | 7/1992 | Greig ............................ 285/21.2 |
| 5,163,713 A | * | 11/1992 | Brettell et al. ................. 285/21.2 |
| 5,228,186 A | * | 7/1993 | Brettell et al. ................. 29/611 |
| 5,252,810 A | * | 10/1993 | Trosch et al. ................. 285/21.2 |
| 5,261,462 A | | 11/1993 | Wolfe et al. |
| 5,268,050 A | | 12/1993 | Azari |
| 5,316,046 A | | 5/1994 | Igarashi et al. |
| 5,338,920 A | * | 8/1994 | Okusaka et al. ............. 285/21.2 |
| 5,364,130 A | * | 11/1994 | Thalmann .................... 285/21.2 |
| 5,398,974 A | * | 3/1995 | Mizukawa et al. .......... 285/21.2 |
| 5,407,436 A | | 4/1995 | Toft et al. |
| 5,425,981 A | | 6/1995 | Bruning et al. |
| 5,445,191 A | | 8/1995 | Green et al. |
| 5,445,848 A | | 8/1995 | Venzi et al. |
| 5,618,065 A | * | 4/1997 | Akiyama ....................... 285/21.2 |
| 5,629,062 A | | 5/1997 | Ejiri et al. |
| 5,674,588 A | * | 10/1997 | Porfido et al. ................. 285/21.2 |
| 5,788,908 A | | 8/1998 | Murakami |
| 5,988,689 A | * | 11/1999 | Lever ............................ 285/21.2 |

| | | | |
|---|---|---|---|
| 6,039,084 A | | 3/2000 | Martucci et al. |
| 6,059,319 A | * | 5/2000 | Wyke ............................ 285/21.2 |
| 6,109,306 A | | 8/2000 | Kleinert |
| 6,112,771 A | | 9/2000 | Aoyagi et al. |
| 6,164,702 A | * | 12/2000 | Hauber et al. ................. 285/21.2 |
| 6,394,502 B1 | * | 5/2002 | Andersson .......... B29C 66/1122 285/21.2 |
| 6,406,063 B1 | * | 6/2002 | Pfeiffer ........................ 285/21.2 |
| 6,478,338 B1 | * | 11/2002 | Dalmolen et al. ............ 285/21.2 |
| 6,656,318 B1 | | 12/2003 | Sabouraud et al. |
| 6,670,005 B2 | | 12/2003 | Kinura et al. |
| 6,716,503 B1 | | 4/2004 | Hauber |
| 6,773,773 B2 | | 8/2004 | Hauber |
| 6,804,942 B2 | | 10/2004 | Bryant |
| 6,807,988 B2 | | 10/2004 | Powell et al. |
| 6,844,040 B2 | | 1/2005 | Pabedinskas et al. |
| 6,889,716 B2 | | 5/2005 | Lundberg et al. |
| 6,893,604 B2 | | 5/2005 | Hauber |
| 6,902,205 B2 | | 6/2005 | Bouey et al. |
| 7,063,118 B2 | | 6/2006 | Hauber et al. |
| 7,093,620 B2 | | 8/2006 | Dehennau et al. |
| 7,166,177 B2 | | 1/2007 | Friedrich et al. |
| 7,238,400 B2 | | 7/2007 | Gerez et al. |
| 7,293,590 B2 | | 11/2007 | Martin |
| 7,600,537 B2 | | 10/2009 | Bhatnagar et al. |
| 7,781,040 B2 | | 8/2010 | Coyle |
| 7,946,629 B2 | | 5/2011 | Conley et al. |
| 8,042,252 B2 | | 10/2011 | Conley et al. |
| 8,398,119 B2 | * | 3/2013 | Kenworthy ................... 285/21.2 |
| 2002/0054968 A1 | | 5/2002 | Hauber |
| 2002/0150752 A1 | | 10/2002 | Debalme et al. |
| 2003/0026928 A1 | | 2/2003 | Bryant |
| 2003/0127147 A1 | | 7/2003 | Van Dam et al. |
| 2003/0209312 A1 | | 11/2003 | Hauber |
| 2004/0089405 A1 | | 5/2004 | Friedrich et al. |
| 2005/0183785 A1 | | 8/2005 | Lundberg et al. |
| 2005/0287326 A1 | | 12/2005 | Schunke et al. |
| 2006/0016552 A1 | | 1/2006 | Barbone et al. |
| 2007/0028983 A1 | | 2/2007 | Lord et al. |
| 2007/0062595 A1 | | 3/2007 | Bhatnagar et al. |
| 2007/0200342 A1 | | 8/2007 | Roberts-Moore et al. |
| 2007/0277895 A1 | | 12/2007 | Zandiyeh |
| 2008/0006337 A1 | | 1/2008 | Quigley et al. |
| 2008/0036198 A1 | | 2/2008 | Roberts-Moore et al. |
| 2008/0047657 A1 | | 2/2008 | Jander |
| 2009/0011210 A1 | | 1/2009 | Gao et al. |
| 2009/0097910 A1 | | 4/2009 | Cloos et al. |
| 2010/0218839 A1 | | 9/2010 | Conley et al. |
| 2010/0266789 A1 | | 10/2010 | Conley et al. |
| 2010/0291342 A1 | | 11/2010 | Jung et al. |
| 2010/0295299 A1 | | 11/2010 | Ziu |

FOREIGN PATENT DOCUMENTS

| | | |
|---|---|---|
| CN | 2268175 Y | 11/1997 |
| DE | 4307704 | 9/1994 |
| EP | 0385731 A1 | 9/1990 |
| EP | 0750973 A2 | 1/1997 |
| EP | 0969236 A2 | 1/2000 |
| EP | 0972980 | 1/2000 |
| EP | 1388703 A1 | 2/2004 |
| GB | 1199447 | 7/1970 |
| GB | 1263060 A | 2/1972 |
| GB | 1444560 | 8/1976 |
| GB | 2314597 | 1/1998 |
| GB | 2347892 A | 9/2000 |
| JP | H08270873 | 10/1996 |
| JP | 2003207077 A | 7/2003 |
| WO | 9104845 | 4/1991 |
| WO | WO 91/07272 | 5/1991 |
| WO | 9848207 | 10/1998 |
| WO | WO 01/92775 A | 12/2001 |
| WO | WO 03/086756 A1 | 10/2003 |
| WO | WO2011/053141 A1 | 5/2011 |

\* cited by examiner

CONNECTION FOR A THERMOPLASTIC PIPE, ASSEMBLY AND METHOD

FIELD

The present invention relates to a connection for a pipe and, in particular, to a coupling for a thermoplastic pipe and pipe systems and methods including the connection.

BACKGROUND

Pipe couplings may be employed to connect adjacent ends of pipe to create longer lengths thereof or to connect the pipe to an end fitting. Pipe couplings should be reliable and relatively straight forward to install.

SUMMARY

A pipe coupling has been invented for forming pipe connections. A system and a method employing the coupling have also been invented.

In accordance with one aspect of the present invention, there is provided a pipe coupling for forming a pipe connection, the pipe coupling comprising: a wall formed as a tube and including an inner surface defining an inner diameter and an outer surface; an electrical conductor supported by the wall and extending about a circumference of the coupling; and a pair of contacts exposed on the outer surface and electrically in contact with the electrical conductor for connecting an electrical power source to the electrical conductor.

In accordance with another broad aspect of the present invention, there is provided a flexible pipe connection system comprising: a pipe having a wall including an inner surface defining an inner diameter of the pipe, an open end through which the inner diameter is accessed, and a thermoplastic outer jacket exposed on an outer surface of the pipe adjacent the open end; and a connection for connecting to the open end of the pipe, the connection including an outer coupling and an insert, the outer coupling including an inner wall surface, an outer wall surface and a wall between the inner wall surface and the outer wall surface, an electrical conductor supported by the wall and extending about a circumference of the outer coupling, a pair of contacts exposed on the outer wall surface and electrically in contact with the electrical conductor for connecting an electrical power source to the electrical conductor and the insert including an outer tubular surface and having a rigidity greater than that of the outer coupling, the system including the insert installed within the inner diameter to support the pipe and outer coupling installed over the pipe with the electrical conductor overlapping the thermoplastic outer jacket and the inner wall surface fused to the thermoplastic outer jacket by thermoplastic melting of the thermoplastic outer jacket by the electrical conductor.

In accordance with another broad aspect of the present invention, there is provided a method for connecting a first pipe to a second pipe, the first pipe and the second pipe each having a wall including an inner surface defining an inner diameter, an open end through which the inner diameter is accessed, and a thermoplastic outer jacket exposed on an outer surface of the wall adjacent the open end, the method comprising: inserting an end of the first pipe into an outer coupling including outer coupling formed as a tube and including an inner wall surface defining an inner diameter, an outer wall surface, an electrical conductor supported by the outer coupling and extending about a circumference of the outer coupling, a pair of contacts exposed on the outer wall surface and electrically in contact with the electrical conductor for connecting an electrical power source to the electrical conductor, positioning the outer coupling with the electrical conductor overlapping the thermoplastic outer jacket of the coupling, generating an electrical current through the electrical conductor to melt the thermoplastic outer jacket and to fuse the first pipe to the outer coupling, inserting an end of the second pipe into the outer coupling and positioning the outer coupling with the electrical conductor overlapping the thermoplastic outer jacket of the coupling, and generating an electrical current through the electrical conductor to melt the thermoplastic outer jacket and to fuse the second pipe to the outer coupling.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION OF THE INVENTION

Figure 1:
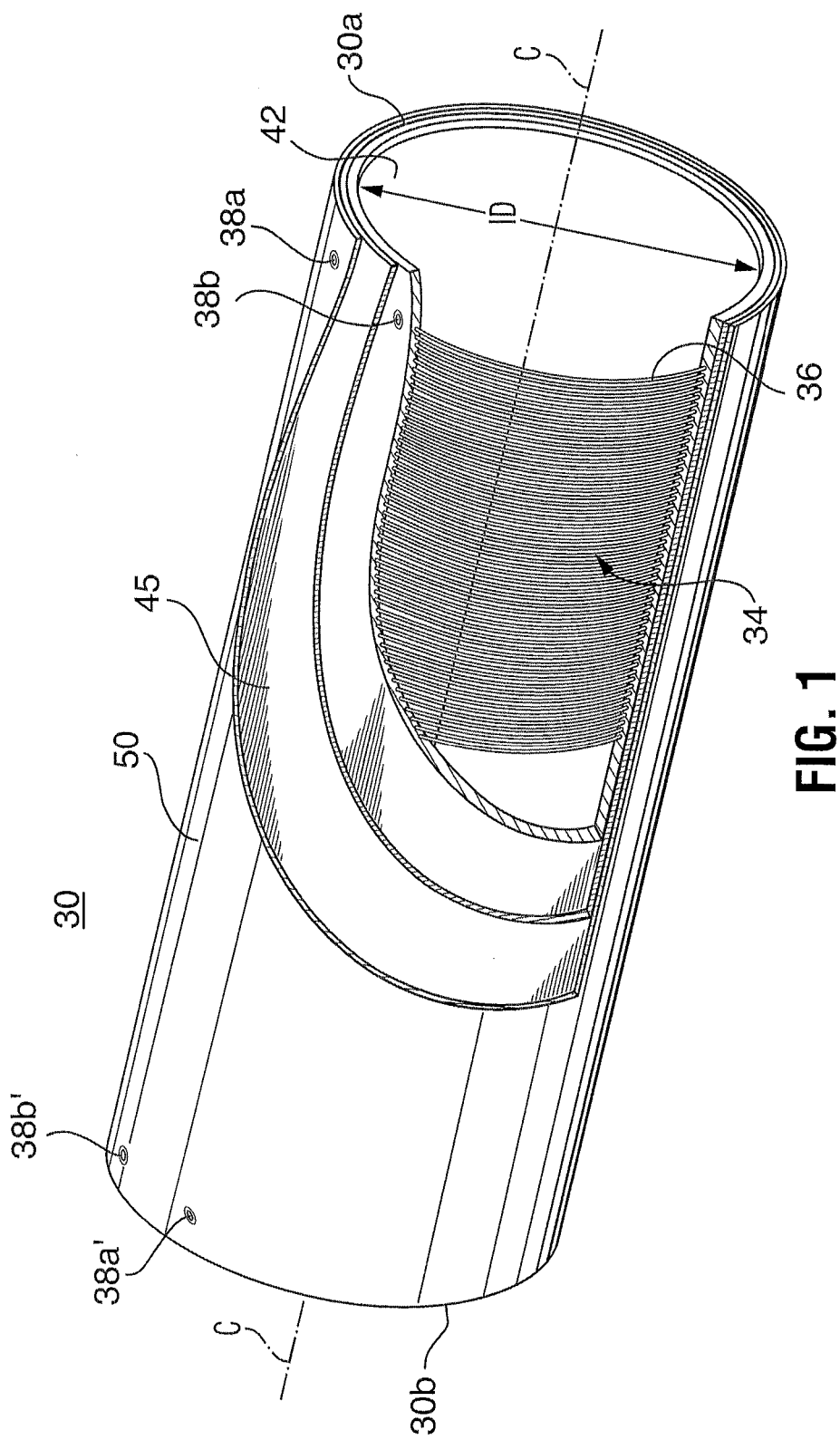
FIG. 1 is a perspective view, partly cut away, of an embodiment of an outer coupling for a pipe connection.

The description that follows and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

Pipe couplings are employed to connect pipes in an end to end configuration and/or to connect an end fitting to a pipe.

The present coupling is reasonably durable, reliable and relatively easy to use. The present coupling permits ready connection of a flexible pipe substantially without adversely affecting the performance of the flexible pipe and without significantly increasing the outer diameter of the pipe, which allows spooling of the pipe and installation with a plough chute, the installation known as ploughing.

Couplings and pipe connections according to the present invention are shown in the Figures. While the illustrated couplings are shown joining the ends of two adjacent lengths of pipe, it is to be appreciated that by replacing one illustrated side of the connection with an end fitting, the coupling can be employed to connect a pipe to an end fitting.

Figure 2:
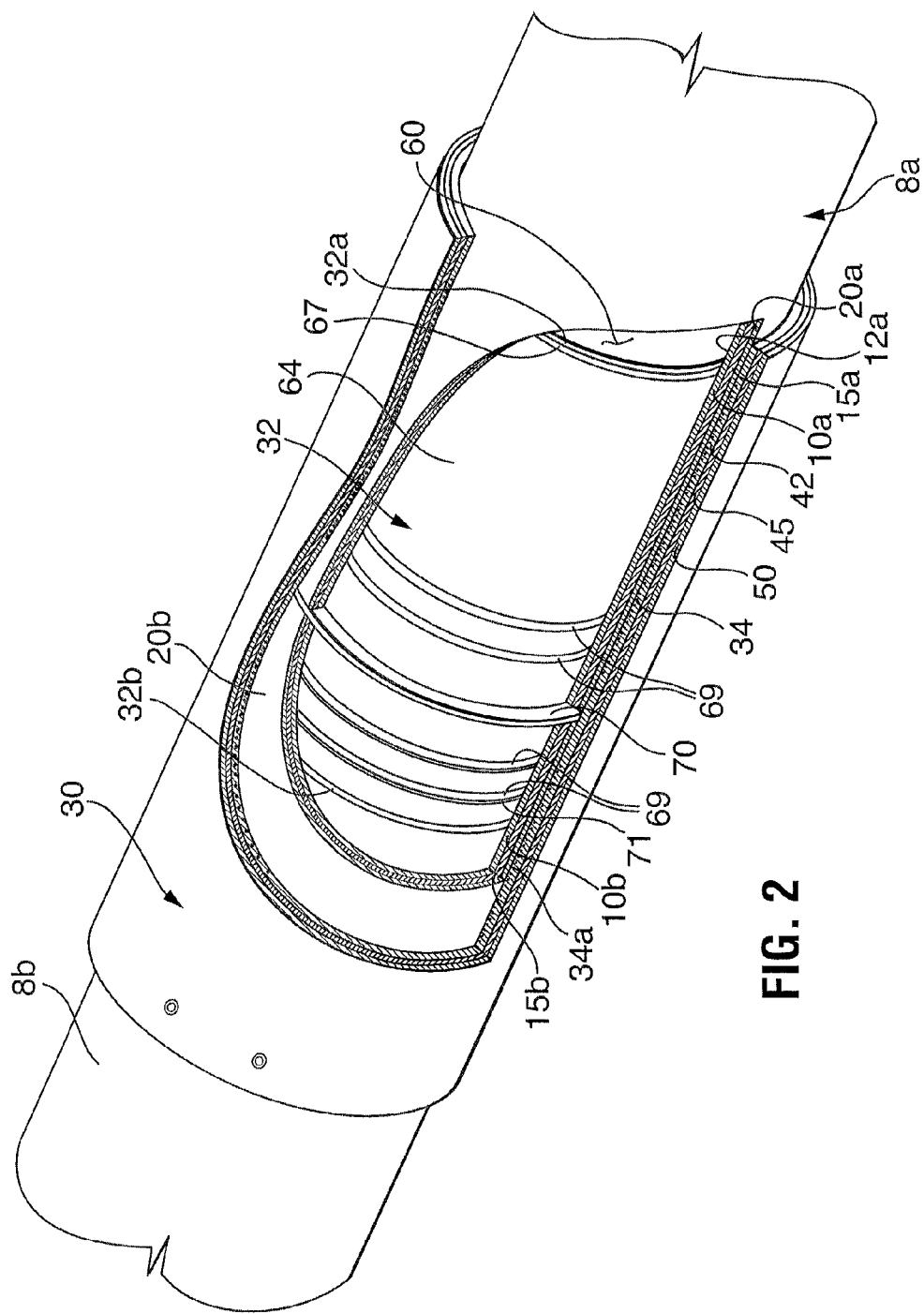
FIG. 2 is a perspective view, partly cut away, of an embodiment of a pipe connection.

With reference to FIGS. 1 and 2, the connection includes an outer coupling 30 for joining the adjacent ends of two lengths of pipe 8a, 8b. Each pipe to be connected to the coupling includes an inner surface 12a, 12b defining the inner diameter of the pipe and an outer jacket 20a, 20b formed of thermoplastic. Coupling 30 can be formed integral to one of the pipes to be connected (FIG. 6) or, as shown in FIGS. 1 and 2, as a separate component to be positioned over the ends of pipes 8a, 8b to be connected, in particular, with some overlap between the end of pipe 8a and outer coupling 30 and with some overlap between the end of pipe 8b and outer coupling 30. Coupling 30 may extend a length equal to about three to eight times its inner diameter ID.

Outer coupling 30 is formed as a tube including ends 30a and 30b that are open to its inner diameter ID. In the connection, the pipe ends are located within the coupling's inner diameter, with the outer coupling encircling them.

In this embodiment, outer coupling 30 is secured to the pipe ends by electrofusion, wherein heat generated by an electrically resistive conductor 34 is employed to melt an amount of the coupling and an amount of the jackets 20a, 20b of the pipes and cause the jackets to bond to the liner. The coupling liner about the resistive conductor may be melted by the electrically resistive conductor, allowing the melted jacket material and the melted material of the coupling, which was adjacent to conductor 34, to combine and create a fused material that, when allowed to set, causes the pipe and the coupling to become integrally connected.

The outer coupling, in this embodiment, may have a tubular laminate construction including for example, a liner 42, a reinforcement layer 45 including one or more plys of reinforcing fibers and an outer jacket 50 encircling the reinforcement layer.

In one embodiment, the liner, the reinforcement layer and the outer jacket each contain a thermoplastic. For example, the plys of reinforcements making up layer 45 may include reinforcing fibers in a matrix containing thermoplastic and the inner liner and the outer jacket may each include at least one layer of a thermoplastic. The thermoplastic may have one or more of the following characteristics: (i) a softening temperature greater than 100° C., (ii) a brittleness temperature less than −60° C., (iii) a melt temperature of 120 to 300° C., (iv) a tensile strength of 16 to 100 MPa, (v) an elongation to break of at least 50%, for example, of 100 to 1000%, (vi) resistance to fatigue cracking when subjected to 1 million cycles at 1% strain, and (vii) a notched IZOD impact strength greater than 30 J/m. In one embodiment, the inner liner, the reinforcement layer and the outer jacket each contain the same type or compatible types of thermoplastic and those thermoplastics have all of the above noted attributes (i) to (vii) and are capable of becoming fused together.

The thermoplastic's low melt temperature offers a moldability that allows coupling components to be readily fused to other components, such as during construction of the coupling or connection of the coupling to a pipe. For example, by forming parts of the same type of thermoplastic, they can be fused together when heated above the melt temperature of that thermoplastic.

The thermoplastic's low brittleness temperature and high elongation provide the outer coupling with a flexibility suitable for installation by ploughing into the ground and for spooling.

The thermoplastic resistance to fatigue cracking enables the outer coupling to achieve fatigue performance of greater than 730,000 pressure cycles from atmospheric to maximum allowable pressure without leaking. Greater than 2,000,000 cycles has been demonstrated in testing.

The thermoplastic impact strength allows the outer coupling to withstand a 125 J impact at −25° C., and retain sufficient strength to satisfy a 20 year life at maximum operating pressure for the outer coupling.

The thermoplastic has excellent chemical resistance, which makes the outer coupling suitable for conditions where it may come in contact with water, $CO_2$, and gaseous and liquid hydrocarbons.

Examples of suitable thermoplastic types include polyamides (PA), polyethylene and polypropylene.

Outer coupling may have various diameters such as of 50 to 600 mm (2 to 24 inches) inner diameter with a maximum operating pressure of 500 bar (7250 psi). The more common diameters are for example 125 to 300 mm (5 to 12 inches) inner diameter and typical operational pressures are 50 to 103 bar (725 to 1500 psi). Even while being formable as a large diameter, composite outer coupling, it retains useful properties such as being self supporting, flexible and having good impact resistance. Outer coupling may be formed in specified final lengths or may be obtained from cutting a longer pipe into the desired final lengths.

The outer coupling may have a fully bonded construction. For example, in one embodiment, the reinforcement layer is fully bonded to inner liner 42 and to outer jacket 50 and each ply of reinforcements is bonded to any plys radially inwardly and radially outwardly of it. The reinforcement layer, therefore, may have a high inter-ply shear strength. Bonding may be achieved by thermoplastic melt fusion, which may include heating the materials to be contacted to a temperature above their melt temperature, bringing the materials into contact, and allowing the materials to cool at which time the contacted materials become fused together. In one embodiment, for example, a "thermoplastic tape placement" method may be employed whereby the thermoplastic tape and the substrate over which the tape is being applied are heated above their melting points. At the zone of contact, the tape is forced onto the substrate, for example, with a compaction roller. As a result of heat and pressure, the tape and the substrate onto which the tape is applied are fused together.

Inner liner 42 is tubular having an inner surface defining inner diameter ID. The reinforcement layer is applied over the outer surface of the inner liner.

The liner is selected to support conductor 34 and to provide material with which the pipe outer jacket may fuse. When formed of a thermoplastic material, liner 42 supplies an amount of molten thermoplastic to fuse with the thermoplastic of the pipe outer jacket 20.

As noted above, the liner may include a thermoplastic. In one embodiment, the liner includes a main tubular component formed of thermoplastic. Currently, polymers of greatest interest are polyamides, polypropylenes or polyethylenes such as high density polyethylene (HDPE). For petroleum operations, HDPE is particularly useful as it provides good chemical compatibility with many oilfield chemicals at a reasonable cost.

In some embodiments, the liner or a ply thereof is filled, for example, with amorphous clays, chopped glass or carbon fibers. These materials can enhance liner stability, for example, against low temperature cracking, against polymer creep for long term integrity and may enhance the initial strength of the liner following extrusion. The fibers can be aligned or random.

In some embodiments, the liner may be a tubular laminate including a plurality of tubular layers. A multi-layered liner can include, for example, more than one layer of the same material or of different materials. Particular layers may be selected to confer various performance characteristics to liner 42.

Liner 42 supports resistive conductor 34. The resistive conductor may be exposed on the inner surface or embedded in the liner material. The resistive conductor may be a metal strip, wire, etc. that encircles the coupling's inner diameter. In one embodiment, the resistive conductor 34 is a wire 36 wrapped at least once around the coupling inner diameter and connected at each end to a terminal 38a, 38b. Terminals 38a, 38b are exposed for electrical communication to the wire. As shown, the wire may be coiled a number of times to create an axial length of the coupling over which the electrical conductor acts. While, a single conductor could be supported over a length to act on both pipe ends to be inserted into the coupling, the present coupling includes two conductors 34, 34a, each with a set of terminals 38a, 38b, 38a', 38b', respectively. The conductors 34, 34a are spaced apart a distance sufficient such that one conductor 34 is positioned to act on one pipe 8a, while the other conductor 34a is positioned to act on the other pipe 8b. As such, each pipe can be connected independently to the coupling. Allowing the pipes to be connected into the coupling one at a time provides for greater flexibility in operations. For example, the coupling can be attached to one pipe and transported to the field together before being connected to another pipe in the field.

Conductor 34 can include various metals such as copper, steel, aluminum, etc. that generate heat when an electrical current is established therein. In the illustrated embodiment, copper wire 36 is employed with a pitch dependent on the melting temperature of the material of liner 42 and jacket 20, the wire diameter, the desired length of the fusion zone and the internal coupling diameter. As shown, copper wire 36 may be wrapped a large number of times about the coupling's inner diameter to form conductor 34.

Forming the jacket 20 and liner 42 of at least compatible, if not the same material, such as HDPE or PA, facilitates fusion and ensure that the two materials melt under similar conditions.

The reinforcement layer, including the number of plys of reinforcements, the nature of the reinforcements and their construction, determines, for the most part, many of the operational parameters of the outer coupling including, for example, burst strength, axial pull strength, pressure holding capability, and flexibility. For example, the number of reinforcement plys can be selected to determine the axial strength and pressure class of the outer coupling, with fewer plys offering a coupling with lower pressure holding and/or lower axial strength characteristics.

There are one or more plys of reinforcements in layer 45. The plys may be arranged axially, that is extending substantially directly from end 30a to end 30b, and/or may be wound circumferentially around the diameter of the coupling. In one embodiment, layer 45 includes at least one ply applied with the fiber reinforcements extending substantially axially along the length of the coupling, at least one ply wound in a positive or clock-wise helical direction and at least one ply wound in a negative or counter-clockwise helical direction. One or more further plys of fiber reinforcements may be applied between the inner liner and the outer jacket.

Figure 3:
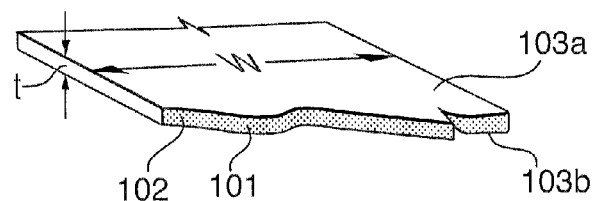
FIG. 3 is a perspective view, partly cut away of a reinforcing tape.

While the reinforcements can be applied in various ways, one embodiment applies the reinforcements in the form of a tape. The tape employed to form the plys can be configured in various ways. In an embodiment as shown in FIG. 3, a tape includes a plurality of reinforcing fibers 101 in a matrix 102.

The reinforcing tape has a length much greater than its width w and the reinforcing fibers extend along the length of the tape to accommodate loads applied along the length of the tape, regardless of the applied orientation of the tape. The fibers should also be resistant to degradation by chemicals, such as hydrocarbons and water, intended to be handled, or environmentally present, during use of the outer coupling. Suitable fibers include, for example, glass, carbon, nylon, polyester or aramid. For petroleum operations, glass fibers are of greatest interest due to the low cost and ability to carry the required loads. Elongation to failure of fiber glass is generally less than 3.0% and glass fibers may exhibit a filament strength greater than 1,600 MPa. Particularly useful glass fibers may be very straight and have low boron content, typically less than 1% by weight.

The tape includes 30 to 80% reinforcement fiber by weight, with 50 to 70% by weight fiber content being quite useful for embodiments employing glass fiber reinforcements.

The reinforcing tape includes a thermoplastic matrix. As noted above, the thermoplastic is selected to exhibit characteristics that ensure the flexibility and durability of the outer coupling. For example, the thermoplastic in one embodiment is HDPE. The reinforcing tape may further have a strength optimized by selection of the thermoplastic matrix composition. The tape's impact resistance may also be optimized by selection of the thermoplastic matrix composition.

To enhance the bonding of the matrix to the reinforcing fibers, the matrix may include a coupling agent. The inclusion of a coupling agent has been shown to increase the shear strength and the tensile strength of the tape. The coupling agent also assists the fusion of the reinforcement layer to outer jacket 50 and liner 42. For example, the matrix of the reinforcing tape may include in excess of 5% by weight content coupling agent, with the most useful range determined to be between 10 and 20% by weight. An example of a suitable coupling agent for use with high density polyethylene is maleic anhydride grafted polyethylene. The inclusion of maleic anhydride grafted polyethylene to HDPE has shown to improve the shear strength and tensile strength of a thermoplastic reinforcement tape by 20% when the coupling agent content was increased from 5% to 18% by weight of the matrix.

The matrix composition tape may include additives to improve the impact resistance of the matrix and, therefore, the tape and the outer coupling. Specific to HDPE thermoplastic, impact modifier additives of particular interest include rubber, ethylene vinyl acetate (EVA), styrene butadiene styrene (SBS), styrene isoprene styrene (SIS), styrene ethylene butylene styrene (SEBS) and polyethylene such as medium density polyethylene. Such additives may be added in the range of 1 to 40% by weight of thermoplastic. SEBS, for example, may be added in the range of 3 to 13% by weight thermoplastic content. As another example, the medium density polyethylene may be added in the range 10 to 30% by weight thermoplastic. A useful combination has been determined to be 7 to 10% SEBS and 16 to 18% medium density polyethylene, each by weight in HDPE. When compared to HDPE alone, a matrix containing 8% SEBS and 17% medium density polyethylene in HDPE increased the impact resistance of the matrix composition from 31 to 400 J/m (notched IZOD).

An example of a suitable SEBS is Kraton G1657™, which is a clear, linear triblock copolymer based on styrene and ethylene/butylene with a polystyrene content of about 13%. An example of a suitable medium density polyethylene is Nova RMs539U™, with a density of about 0.9 g/cc and more specifically about 0.939 g/cc.

The thermoplastic matrix can contain both a coupling agent and an additive for improved impact resistance, each of which are as described above.

In one embodiment, the thermoplastic matrix has a high melt index of, for example, 9 to 60. The high melt index ensures adequate impregnation of the matrix into the reinforcing fibers. The tape void content should be no more than 5% and in one embodiment is no more than 3%.

The dimensions of the reinforcing tape may vary, but in one embodiment, they are selected for ease of manufacture. For example, the tape can be relatively thick and wide, for example, having a thickness t between its upper surface 103a and its lower surface 103b in the range 0.6 to 1.5 mm for example, 0.7 to 1.1 mm. The tape can have a width w of 25 to 40% or 30 to 35% of the coupling's outer diameter to facilitate tape placement, meaning that for most large diameter embodiments the tape has a width of greater than 45 mm. The large thickness and width of the tape allows the outer coupling to be efficiently manufactured, for example, using a tape placement method.

Reinforcement layer 45 provides axial and circumferential strength to the coupling. In order to minimize material use and coupling diameter, which is important for handling by ploughing, plys of reinforcing tape are orientated in the primary direction of the load to be borne by the coupling. In some embodiments, outer coupling may be substantially isolated from circumferential loads at the connection and the coupling in such an embodiment tends to bear primarily axial loads, those forces tending to pull the pipes apart. The reinforcement layer 45 may, therefore, include reinforcing tape plys to provide the coupling with significant strength in the axial direction. For example, in one embodiment, the reinforcement layer 45 includes one or more hoop wound plys and one or more plys where the reinforcement fibers extend substantially axially along the length of the coupling from end 30a to end 30b.

In one embodiment, one or more reinforcing plys in layer 45 are applied at an angle of less than 20° off the center axis c providing strength predominantly in the pipe axial direction. If these plys are applied at an angle significantly off 0°, these plys may be added in even numbers with alternating clockwise and counter clockwise directions to avoid a structural imbalance in the coupling. In addition, one or more reinforcing plys may be employed at angles greater than 70°, to provide dimensional stability in manufacturing and handling, to absorb some minor circumferential stresses to minimize radial expansion under pressure, to minimize in-plane shear of reinforcing plys, to improve fatigue performance and to provide added impact resistance.

In one embodiment, the reinforcement layer includes two plys applied at less than 20° providing strength predominantly in the coupling's axial direction, along axis c, and one ply applied at greater than 70°, such as between 85° and 90°, providing strength predominantly in the coupling's circumferential direction. In another embodiment, however, a plurality of plys are applied at winding angles of between 40° and 70°, such as between 50° and 60°.

Outer jacket 50 surrounds reinforcement layer 45. While the outer coupling will function without the outer jacket, it acts to protect the reinforcement layer from damage, as by cut, abrasion, and impact.

The outer jacket can be formed of any flexible material that can protect the reinforcing fibers to some degree and in this embodiment, is capable of fusing to the underlying layer of the outer coupling. As will be appreciated with consideration as to the intended use of the outer coupling, outer jacket 50 can be selected to be substantially resistant to degradation by environmental effects (i.e. ultraviolet light, weather, etc.) and by the chemicals that may come in contact with it. In this embodiment, as noted above, the outer jacket includes a thermoplastic and can be filled with reinforcements, if desired. Currently, the thermoplastic of greatest interest is polyethylene, for example, HDPE.

As desired, the outer jacket can include or have attached thereto identifiers, paint, coloration, bar-coding, chips, etc. or materials facilitating use or installation such as, for example, survey locatable metal parts.

Jacket 50 may be applied to the outer coupling in various ways. For example, the jacket materials can be applied as by extrusion, spraying, dipping, tape winding, shrink wrapping, and braiding. In one embodiment, the jacket is extruded onto the outer coupling. In another embodiment, a tape can be employed such as a HDPE tape, for example a neat (i.e. non-reinforced) or a low fiber content reinforced HDPE tape. The tape can be wound about the reinforcement layer using a tape placement method.

In the coupling, as noted, all layers 42, 45 and 50 may be bonded together. Such bonding ensures that there is adequate load transfer from coupling liner 42 and jackets 20 into reinforcement layer 45 of the coupling.

To facilitate fusion of the coupling to the pipes, the coupling inner diameter ID may be selected to be substantially similar to or slightly less than the outer diameter of the pipes, such that a close fit is ensured.

The thickness of the coupling may be selected to minimize the outer diameter of the coupling relative to the outer diameter of the pipe. As noted above, the thickness can in part be controlled by effective placement of the reinforcements.

The connection may also include an insert 32 for insertion into the open inner diameters of the ends of pipes 8a, 8b to be connected while outer coupling 30 is positioned over the ends of the pipes, with some overlap between insert 32, pipes 8 and outer coupling 30.

Figure 4A:
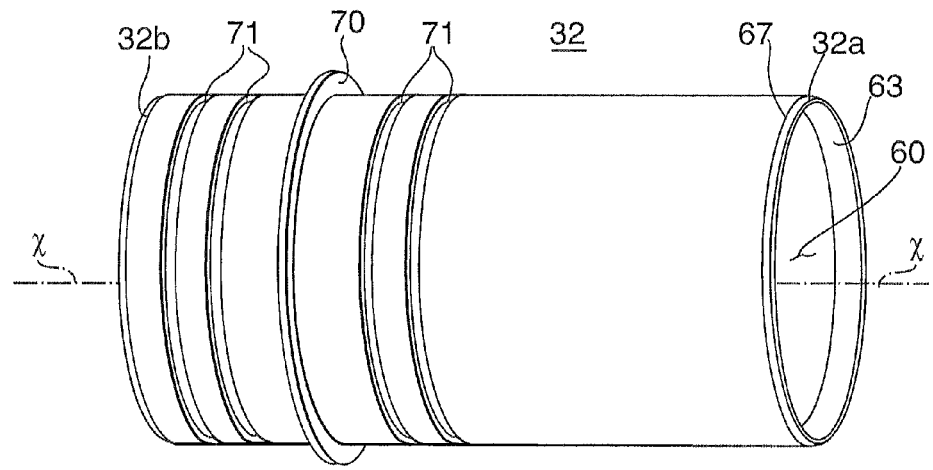
FIGS. 4a and 4b are perspective views of embodiments of inserts for a pipe connection.

With reference also to FIG. 4a, one embodiment of an insert 32 is shown. Insert 32 may be formed as a tubular body including an inner bore 60 defined by its inner surface and an outer surface 64. Pipes 8a, 8b to be connected end to end are installed over nipple ends 32a, 32b of the insert and inner bore 60 provides communication between the inner diameters of the pipes. Insert 32 protects the pipe ends against damage by shielding the ends from fluid flows and activities in the pipes. While an insert is shown for connection of two pipes it is to be understood that an insert could have a nipple end for insertion into a pipe with an opposite end formed as a flange for connection to a flange fitting or an opposite end for butting against an end of the pipe in which the nipple end is inserted.

Insert 32 may act to strengthen the connection and support the pipes against collapse during installation of coupling 30. In particular, one of the primary functions of the insert is to eliminate delamination of the pipe during electrofusion heating. The strength and stiffness of the insert resists radial contraction of the pipe. The insert is more rigid than the pipes and the coupling. Insert 32 may therefore be formed of a durable and strong material sufficient to withstand the compressing force generated when installing outer coupling 30 over the ends of the pipes. Insert 32 may, for example, be formed of a metal, such as for example steel, including corrosion resistant steels, coated steels, etc. or polymers such as for example, thermoplastic, including reinforced thermoplastic such as, for example, glass reinforced HDPE or polyamides (PA) for example nylon. Care may be taken to select a material that is not adversely softened by the electrofusion process such that risk of collapse is mitigated.

Figure 4B:
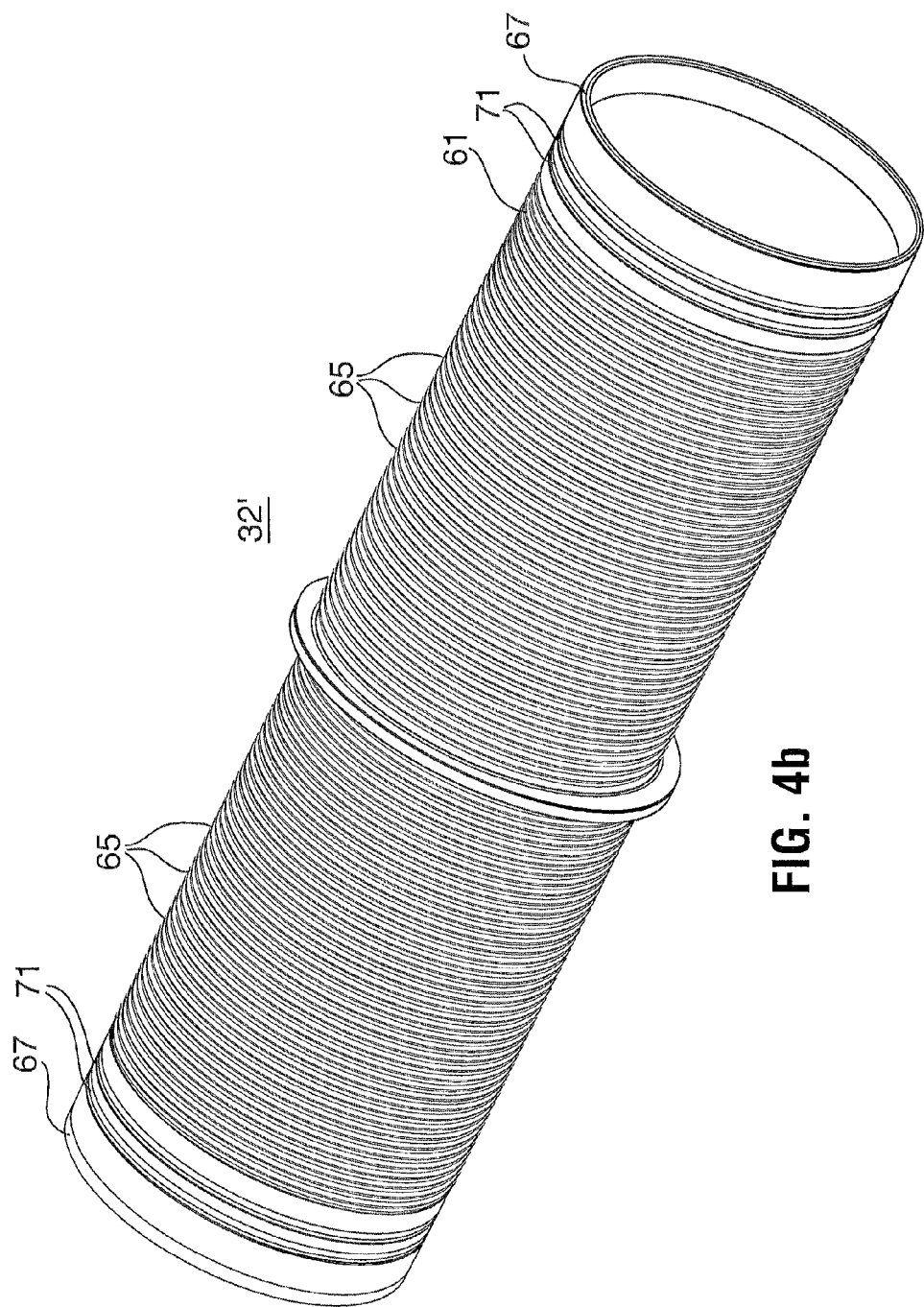

To protect against collapse and delamination of the pipe during electrofusion, the pipe may be internally supported. For example, in one embodiment, insert 32 may have a length to at least underlap the location of the conductor 34 in outer coupling 30 where electrofusion will occur. While the insert can have a length to underlap both conductors 34, 34a (as shown in FIG. 4b), in some embodiments as shown in FIG. 4a, the insert need not have two elongated ends. For example, if the coupling is to be installed on one pipe in the manufacturing process (before shipment), the inner diameter of that first pipe can be supported by a removable means during connection of the coupling and no permanently installed insert is needed for support. However, an insert may be employed to support the connection of the second pipe at the opposite end of the coupling. Thus, an insert may be employed having a length sufficient to fit within the second pipe and to underlap the location of the conductor in the coupling. If it is desirable to employ a coupling that also protects the ends of the pipes, the insert may have a short end that is inserted in the first pipe and a long end, for example end 32a, that has a length sufficient to fit within the pipe and underlap the length of the conductor in the coupling to be installed thereover in the field (after shipping). In that embodiment, insert 32 may have one end that is elongated to extend under the entire area of electrofusion to be conducted later.

If there is no need to support the pipe during electrofusion, the insert may be employed only to protect the ends of the pipes or to create a seal with the inner diameter of the pipes, such that the insert has no elongated ends. In another embodiment, the insert may take other forms for example a multipart construction or a more simple tubular form.

The illustrated insert of FIGS. 2 and 4a, which has a shorter end 32b that doesn't underly the electrofused end of the coupling, can be installed to one pipe at this end 32b under controlled conditions by use of removable means, such as a removable mandrel or internal pressure to act against collapse and delamination of that pipe during electrofusion. However, because the insert has this shorter end, the amount of material required to produce the insert may be reduced, which may offer savings in terms of cost and weight.

Insert 32 may also act to seal against fluid leakage at the connection from the inner diameter conduits of the pipes installed thereon and may accept most of the circumferential loads at the connection, thereby isolating the coupling from those loads.

For example, seals 69 may be installed between insert 32 and the inner surfaces 12a, 12b of the pipes. For example, one or more annular seals 69, such as provided by o-rings, can be installed in annular grooves 71 in the outer surface of the insert and in positions to be overlapped and borne upon by the pipes. For durability, seals 69 may be formed of a suitable material such as an elastomer, for example, nitrile, polyurethane or a fluoroelastomer such as Viton™. Back-up (i.e. anti-extrusion) rings may be installed, if desired. Seals 69 can be positioned on insert such that they are close to the intended positions of the ends of pipes, such that they provide a balanced bi-axial stress state to as much pipe length as possible.

Seals 69 can provide a primary seal against leakage at the connection relieving concerns about pressure integrity at the electrofused connections. In an embodiment, as shown in FIG. 4a, where insert 32 has one long end 32a and one short end 32b, the short end is long enough to accommodate seal glands 71 to properly position seals 69.

In the illustrated embodiment, insert ends 32a, 32b are tapered at their inserted ends, as by chamfering, to form a frustoconical surface 63 at their inner diameters opening to bore 60 in order to minimize disruptions of fluid flow and/or tools, such as pigs, passing through the pipes when connected. The outer surfaces at the inserted ends of ends 32a, 32b may also have a frustoconically formed surface 67 to facilitate installation of the pipe ends over the insert.

Insert 32 may include a shoulder 70 that extends outwardly from the outer surface and extends circumferentially generally orthogonally to the long axis x and against which the pipe ends can be butted. Shoulder 70 may be fully about the circumference, if desired. Shoulder 70 has an outer diameter greater than the ends over which the pipes are installed and creates a stop against which the pipes abut. Shoulder 70 may, therefore, be employed to ensure that the pipes are properly located on the insert, for example that the insert is inserted to the intended depth in the pipes and seals 69 are properly positioned adjacent the ends of the pipes.

Another insert 32' is shown in FIG. 4b. This insert includes serrations 65 on its outer surfaces 61 to engage the inner surface of the pipe to be installed thereover. The serrated insert provides a function in addition to the already disclosed insert. This function is axial/load sharing with the coupling.

Serrations 65 are a series of profiled teeth that engage, as by embedding into, the inside diameter of the pipes being connected. This embedment is assisted by installing the insert with interference and with the permanent reduction in pipe diameter resulting from the application of electrofusion.

The typical diametrical interference between the insert's outside diameter at its outer surface 61 and pipe inside diameter is in the range 0.0 to 0.4 mm.

The reduction in pipe diameter resulting from electrofusion is typically in the range of 0.2 to 0.5% of the pipe ID.

The serrations may be discreet, continuous circumferentially or spiralling. The serrations may be angled away from the inserted end 67 of the insert to act against forces tending to pull the pipe off the insert, once the pipe is inserted thereover. In one embodiment, the serrations may be formed to permit the material of the pipe to be forced into the valleys between adjacent teeth in the serrations during electrofusion. In such an embodiment, each tooth may include a rear tooth face between a tooth crest and tooth valley that extends substantially without an overhang of the crest over the valley. The valleys can be flattened, rounded or abrupt.

With serrations on the insert, the best sealing position between the pipe and the insert may be at the ends of the insert. Such a sealing position isolates pipe pressure from the mating of the serrations into the pipe liner. If pressure was present between the serrations and the pipe liner, disengagement of the serrations from the pipe may occur, which may reduce the axial load capacity for the insert. Thus, one or more annular grooves 71 may be provided in the outer surface of the insert between the inserted ends 67 and serrations 65 in which annular seals, such as o-rings, may be installed. In this way, seals are in a position to be overlapped and borne upon by the pipes and isolate internal pressures from reaching the serrations.

The presence of serrations allows axial load to be shared by the coupling and the insert by transferring shear loads to the coupling at the outside pipe diameter and to the insert at the inside pipe diameter. The sharing of load may allow the overall length of the connection to be reduced.

To make up the connection of FIG. 2, coupling 30 is slid over the end of one pipe. This may require application of some force, as the tolerances can be quite close. For a consistent connection, the pipe may have its inner diameter prepared, for example by machining, to closely match the outside diameter of the insert.

One end of insert 32 is inserted into that pipe and another pipe is installed over the other end of insert 32. The pipes may be driven up to butt against shoulder 70 to ensure that they are properly positioned on the insert.

The coupling is positioned spanning the intersection of the pipes such that one conductor 34 encircles one pipe and the other conductor 34a encircles the other pipe. The pipe may have its outside diameter prepared, for example by machining, to closely match the inside diameter of the coupling.

After the coupling is positioned, electrical connections are made at contacts 38a, 38b and 38a', 38b'. This creates an electrofusion effect to fuse the coupling to the pipes. The outer surface of the pipes may be cleaned or non-thermoplastic jackets if any, such as any insulation layers, may be peeled back to ensure that the thermoplastic pipe jackets 20a, 20b are exposed for bonding to the coupling. As noted hereinbefore, the process may be broken into steps. For example, the insert and the coupling may be secured to one pipe during the manufacturing process in the shop, while the other pipe is installed to the connection in the field.

To protect against distortion and delamination of the coupling during electrofusion, sufficient reinforcements may be incorporated to the coupling to resist such damage or the coupling may be externally supported.

For example, if coupling distortion is observed to occur as a result of electrofusion, additional circumferential reinforcement may be added in the coupling reinforcement layer to increase hoop strength. This is possible, but not preferable, as the additional material adds cost, weight, and increases the coupling's outer diameter hindering ploughing.

Another option to resist distortion of the coupling is to employ an external clamp. The external clamp may be applied to the exterior of the electrofusion coupling. The application of the clamp can be permanent or temporary. The clamp should be in place when the coupling is being fused to the pipe ends.

The purpose of the clamp is to minimise the radial expansion of the coupling during electrofusion. Delamination of the coupling reinforcement layer is known to occur from the heat induced expansion during electrofusion. The clamp controls expansion to an extent where delamination is avoided.

In comparison to the coupling, the clamp is stiffer in the circumferential direction. Suitable materials used for the construction of the external clamp are metals such as steel and reinforced plastics such as glass or carbon fibre reinforced thermosets or thermoplastics.

In order to make the external clamp removable, it may be split such that it is assembled around the coupling with fasteners as shown in the provided illustration.

Figure 9:
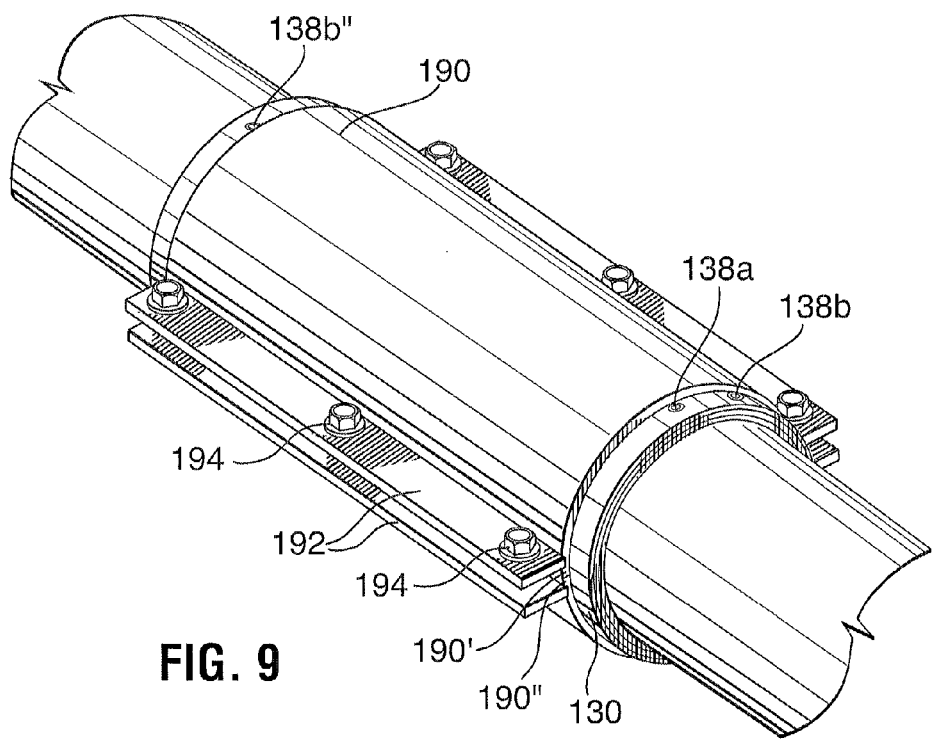
FIG. 9 is a perspective view of a stage of a pipe connection process.

For example, as shown in FIG. 9, a clamp 190 may be positioned about a coupling 130 radially outwardly of the area undergoing electrofusion. The clamp may be long enough to span at least one of the electrofusion sites and possibly all of the sites along the coupling. The clamp may be installable quickly and create a cylindrical support about the coupling. The clamp may be configured to be readily installed about and removed from the coupling. For example, the clamp may be formed as a plurality of long sections of a cylinder and may include an installation mechanism such as flanges and bolts or a strap. The inner diameter of the clamp substantially matches the outer diameter of the coupling about which it is to be used. Clamp 190 of FIG. 9 includes two half cylinders 190', 190" with flanges 192 and bolts 194 for facilitated connection of the halves. The clamp is long enough to span and encircle both resistive conductors in coupling 130 while leaving their contacts 138a, 138b, 138b" exposed for connection.

In one embodiment, the connection can include a mechanism for testing the connection's structural and sealing integrity. The mechanism provides for non-destructive testing of the assembled connection to check integrity according to a method wherein an enclosed volume in a connection is accessed, the enclosed volume being defined between the pipe, the insert, the outer coupling encircling the pipe outer surface and seals including the seals between the pipe and the insert and the seal formed by the fused zone between the pipe and the outer coupling. To check the integrity, the enclosed volume is pressurized to a test pressure and the test pressure is monitored to observe the pressure holding integrity of the seals.

Figure 5:
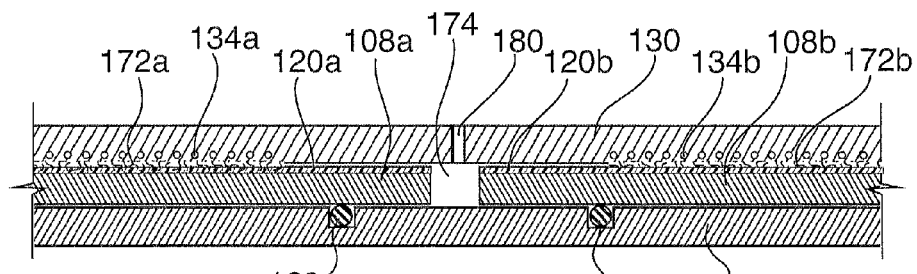
FIG. 5 is a schematic sectional view through a connection.

For example, with reference to FIG. 5, a connection includes an outer coupling 130 and an insert 132 for joining the adjacent ends of two lengths of pipe 108a, 108b. Each pipe includes an outer jacket 120a, 120b formed of thermoplastic. Insert 132 is inserted into the open inner diameters of the ends of pipes 108a, 108b to be connected and outer coupling 130 is positioned over the ends of the pipes. There is radial overlap between insert 132, pipes 108 and outer coupling 130.

The insert supports the pipes against collapse and carries seals, such as o-rings 169, that prevent fluid migration outwardly through the interfaces between the pipes and insert 132. Coupling 130 is connected to pipes 108a, 108b by electrofused zones 172a, 172b between the thermoplastic of the coupling's liner 142 and that of outer jackets 120a, 120b. In the connection, therefore, a small annular volume 174 is created between coupling 130 inside diameter and the outside diameter of the insert, pipes 108a, 108b, o-rings 169 on the insert and the fusion zones 172a, 172b between the coupling inside diameter and the pipe outside diameter.

In one embodiment, the mechanism includes a port 180 through the wall of the coupling in the area between where zones 172a, 172b will be formed, which, for example, is the length of the coupling between the intervals through which conductors 134a, 134b extend. Port 180 may, therefore, be positioned generally centrally between the ends of the coupling.

Port 180 provides for fluid communication to volume 174 after it is formed such that its condition can be tested, which is indicative of the integrity of seals 169 and zones 172a, 172b. The port size can be very small, such as 3 to 10 mm in diameter and, while providing fluid communication to volume 174, can be open, plugged, sealable, tapped, valved, etc.

As an integrity test of the connection sealing at seals 169 and the electrofusion completeness at zones 172a, 172b, the annular volume may be pressurized with a fluid, such as air, another gas, silicone, etc. through port 180. The fluid may be provided from a pressure source, which may be connected and sealed to port 180. The pressurized fluid may be maintained at a regulated pressure such as to 1.4 to 10.3 bar.

By this process, enclosed volume 174 may be pressurized to a test pressure based on the regulated pressure and the pressurized condition of volume 174 can be monitored. In particular, after pressurizing, the pressure source can be isolated from volume 174, for example, via an isolating valve and the pressure in volume 174 can be monitored, for example, with a pressure gauge. An observed reduction in the pressure indicates an inadequate connection seal or incomplete fusion. However, if the test pressure is maintained over a period of time, the connection's integrity is determined to be good.

This process can be employed reliably even in the field using a port 180 formed during manufacture of the coupling or installed thereafter, a pressure source and pressure monitoring equipment.

The insert reduces the load being borne by the coupling. If the insert were not present, coupling 30 would be required to provide sealing and resist both axial loads and circumferential loads resulting from the internal pressure. The internal pressure acting on the inside diameter of the coupling determines the intensity of the circumferential loads. In an embodiment where the insert seals to the open pipe diameters, the intensity of the loads are reduced with the pressure bearing diameter being reduced from the coupling inside diameter to the open pipe diameter. The circumferential load at the connection is resisted by the pipe and not the coupling. The axial load at the connection is resisted by the coupling. As such, the insert enables the coupling to have a reduced thickness as a result of the reduction in coupling load. The smaller coupling diameter is a benefit for assembled pipe handling and ploughing.

Figure 6A:
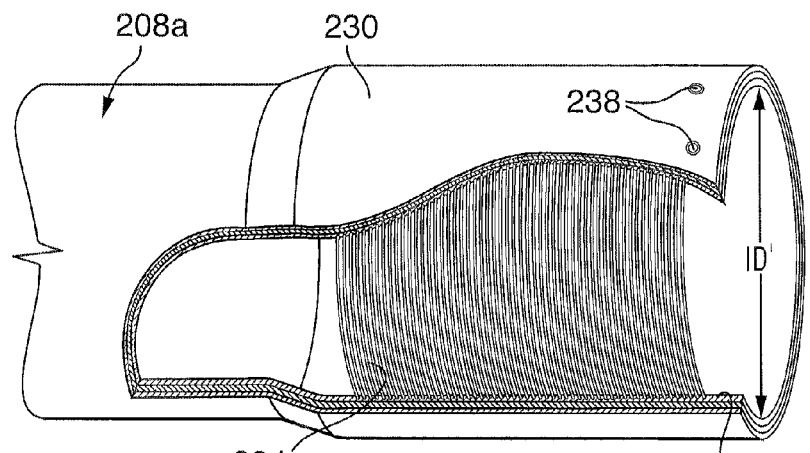
FIGS. 6a and 6b are a perspective views, partly cut away, of an embodiment of a coupling and of an embodiment of a pipe connection.
Figure 6B:
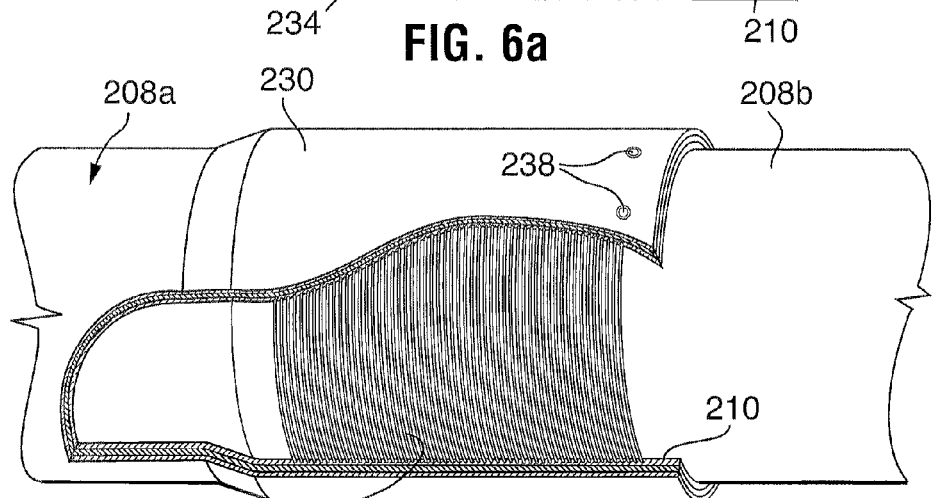

While the connection of FIG. 2, including the use of insert 32 does provide certain benefits, it is to be understood that the coupling may be employed in other ways. For example, as shown in FIGS. 6a and 6b, a coupling may be incorporated in a bell and spigot-type pipe connection. For example, a coupling 230 may be connected to or, as shown, formed integrally with a pipe 208a and the connection may be completed by inserting an end of another pipe 208b into the inner diameter ID' of coupling 230. Thereafter, pipe 208b may be electrofused into the coupling. For example, in one such embodiment, one end of a pipe 208a may be formed to have expanded inner and outer diameters forming coupling 230 as a part of pipe 208a. The inner expanded diameter substantially matches the outer diameter of a pipe 208b to be connected into the coupling. Generally, the pipes 208a, 208b may have similar outer diameters such that the portion of the pipe forming coupling 230 actually has an inner diameter ID' enlarged over the remainder of the pipe from which it is formed. Inner liner 210 forming the inner diameter of the portion of the pipe forming coupling 230 can have a heating wire 234 embedded therein. A pipe connection can thereby be formed when pipe 208b is inserted inside the expanded pipe inner diameter ID' and heating wire 234 is employed. In particular, when wire 234 has communicated thereto an electrical current through contacts 238, the wire heats and melts the liner at the portion of the pipe forming coupling 230 and the pipe jacket exposed on the end of pipe 208b. Upon cooling, inserted pipe 208b and pipe 208a having the coupling formed thereon are fused. The connection is structural, providing resistance to pipe internal pressure. The connection also is continuous about the circumference of the pipes forming a seal to contain the pressurized fluid passing through pipes 208a, 208b.

The connections, as described above, operate to connect one or more pipes with outer thermoplastic jackets to a coupling. The connection can be employed with various types of pipes including flexible pipe. In one embodiment, for example, the connection can be employed with a flexible pipe including a pipe wall reinforcement layer bonded to the outer jacket. For example, as shown in FIG. 2, the illustrated pipes each include an outer jacket 20a, 20b bonded to a reinforcement layer 15a, 15b. The pipes each also include an inner liner 10a, 10b.

In such a pipe, axial loads through the fused zones are transferred from jackets 20a, 20b into the reinforcement layers 15a, 15b. The pipe reinforcement layer can be constructed to effectively handle the loads.

Figure 7:
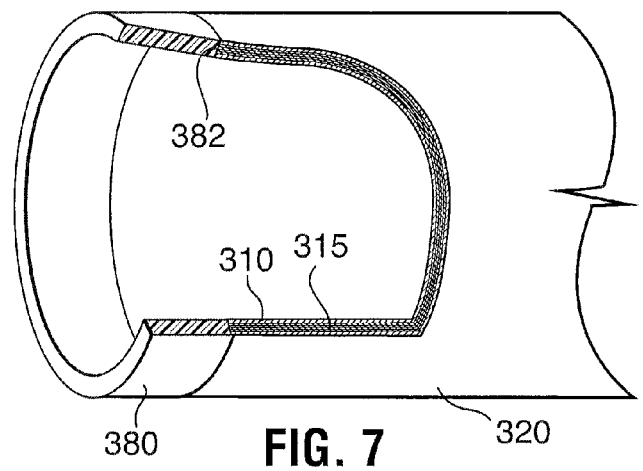
FIG. 7 is a perspective view of a pipe with an end ring.

In some embodiments, such as the one described in FIG. 6, the ends of the pipe may be exposed in the final connection, in such an embodiment especially where the pipe includes a reinforcement layer 15a, 15b, an end cap may be useful to provide protection to any pipe ends that are exposed. For example, with reference to FIG. 7, a cap ring 380 may be installed at an end face 382 of a pipe. Cap ring 380 may protect and seal the otherwise exposed reinforcement layer 315 at the pipe end face. The cap ring, therefore, may be useful in applications where the pipe end face is exposed, such as during handling and transportation and in final installations such as in a pipe connection where the end face is exposed. If employed in final installations, cap ring 380 serves to isolate the reinforcement layer at the pipe end face from the pressurized liquid or gas.

In one embodiment, cap ring 380 may be formed of a thermoplastic material and may be connected to the pipe end face by fusion to the pipe liner 210, reinforcement layer 315 and jacket 320. Fusing may be achieved using various methods such as, for example, butt fusion. The thermoplastic may be of the same type as that used in the pipe construction. HDPE is an example of a typical material.

The cap ring outer and inner diameters may match those of the pipe. The length of the cap ring is variable, but is typically in the range of 10 to 50 mm in length.

When employing a cap ring on a pipe in a connection, if desired, the cap ring outside diameter may be sealed to the inside diameter of the coupling, providing a seal from the pipe to the coupling. Where the end cap and the coupling liner contain thermoplastic, fusion may be employed, thereby forming a seal between the pipe inner liner 310, cap ring 380 and the coupling inner surface.

While cap ring 380 is shown installed on an end of a pipe, it is to be understood that a similar cap ring could be installed on one or both of the coupling ends (for example, ends 30a, 30b of FIG. 1), if desired.

As an alternative to a cap ring, the same function can be provided by fusing a layer of thermoplastic material to the seal between the pipe inner liner and pipe outer jacket. The layer of thermoplastic is applied by spray deposition or extrusion. The layer is typically 1 to 2 mm thick.

Figure 8:
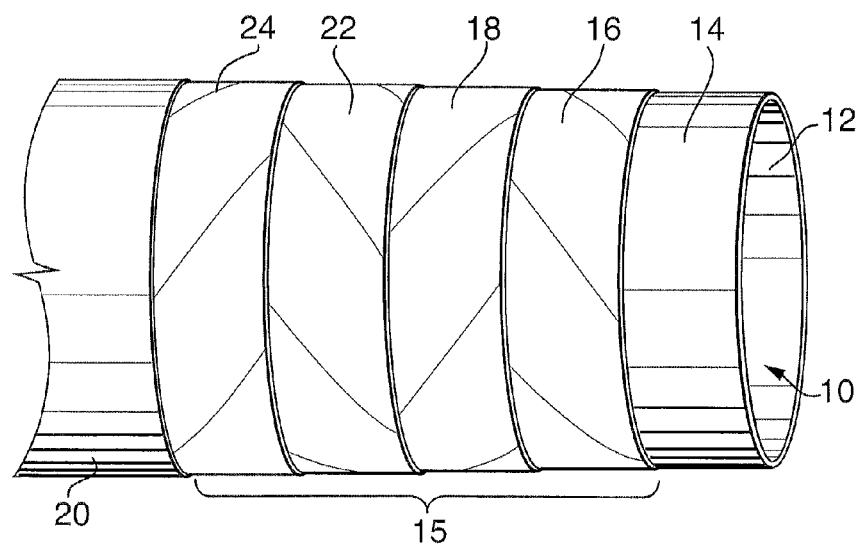
FIG. 8 is a perspective view, partly cut away in successive layers, of an embodiment of a pipe useful in the present invention.

In one embodiment, for example, a pipe 8 according to FIG. 8 may be utilized with the connection. Pipe 8 includes an inner tubular liner 10 having an inner surface 12 and an outer surface 14, a reinforcement layer 15 including a first ply 16 of reinforcing tape helically wrapped about the inner liner and a second ply 18 of reinforcing tape helically wrapped about the first ply of reinforcing tape and an outer jacket 20 applied outwardly of the second ply. The first ply of reinforcing tape is wrapped either clockwise or counterclockwise and the second ply is wrapped in the other of the clockwise or counterclockwise directions, when compared to the first ply. Thus, stated another way, it may be said that one ply is wrapped at a positive helical angle and the other ply is wrapped in a negative helical angle.

While the pipe may include a reinforcement layer with only two plys of reinforcing tape, the embodiment illustrated in FIG. 8 includes a reinforcement layer with a total of four plys including two further plys 22, 24 in addition to the first ply 16 and the second ply 18.

Pipe 8 may have various diameters such as of 50 to 600 mm (2 to 24 inches) outer diameter with a maximum operating pressure of 500 bar (7250 psi). The more common diameters are for example 125 to 300 mm (5 to 12 inches) outer diameter and typical operational pressures are 50 to 103 bar (725 to 1500 psi).

While being formable with large diameters, the pipe retains useful properties such as being self supporting and flexible with good pressure containment and impact resistance. Pipe 8 may be formed in discrete lengths and may be formable into longer lengths, as by connecting a plurality of shorter length pipes end to end using the above-described connections. The longer lengths may be spoolable for convenient handling.

The pipe may have a fully bonded construction. For example, in one embodiment, the reinforcement layer is fully bonded to inner liner 10 and to outer jacket 20 and each ply of tape in the reinforcement layer is bonded to the plys radially inwardly and radially outwardly of it. The reinforcement layer, therefore, may have high inter-ply shear strength. Bonding may be achieved by thermoplastic melt fusion, which may include heating the materials to be contacted to a temperature above their melt temperature, bringing the materials into contact, and allowing the materials to cool at which time the contacted materials become fused together. In one embodiment, for example, a "thermoplastic tape placement" method may be employed.

Inner liner 10 is tubular having an inner diameter defined by inner surface 12 that is open for the passage of fluids therethrough. The reinforcement layer is applied over outer surface 14 of the liner.

The liner is selected to act as a leak and permeation barrier. The liner should be formed of the most molecularly impervious polymer that meets acceptable material costs, as determined by a cost benefit analysis. Generally, the liner should be selected to minimize diffusion of gaseous components of the fluid being conveyed. As will be appreciated, the liner is selected to be substantially resistant to degradation by the fluid to be passed therethrough.

The liner is as thin as possible. In particular, liner 10 can be as thin as it can be manufactured, thus reducing weight and material cost, and improving the flexibility of the pipe. For example, bearing in mind that the pipe diameter may be relatively large, for example offered in diameters of about 6, 8, 10 or 12 inches, the liner may be less than less than 4 mm thick and may have an outside diameter to wall thickness ratio of 30:1 to 50:1. When the pipe is manufactured, the liner can be supported by an internal steel mandrel and, therefore, the liner is not required to support the loads induced by application of the outer layers such as during the winding process of reinforcing plys and the subsequent application of outer jacket 20.

As noted above, the liner includes a thermoplastic. In one embodiment, the liner includes a main tubular component formed of thermoplastic. Currently, polymers of greatest interest are polyamides, polypropylenes or polyethylenes such as high density polyethylene (HDPE). For petroleum operations, HDPE is particularly useful as it provides good chemical compatibility with many oilfield chemicals at a reasonable cost.

In some embodiments, the liner or a ply thereof is filled, for example, with amorphous clays, chopped glass or carbon fibers. These materials can enhance liner stability, for example, against low temperature cracking, against polymer creep for long term integrity and may enhance the initial strength of the liner following extrusion. The fibers can be aligned or random.

In some embodiments, the liner may be a tubular laminate including a plurality of tubular layers. A multi-layered liner can include, for example, more than one layer of the same material or of different materials. Particular layers may be selected to confer various performance characteristics to the liner. For example, one layer in a multi-layered liner may confer resistance to degradation by the fluid being conveyed, and another layer may confer resistance to permeation of gaseous components of the fluid being conveyed. In one embodiment, for example, to enhance resistance to gas permeation, a barrier layer may be employed. For example, a polymeric barrier layer of material with high permeation resistance to gas may be employed. Examples of permeation resistant materials are polyamides and ethylene vinyl alcohol. Such a material may be positioned adjacent inner surface 12.

While the liner may be formed in various ways, extrusion offers a simple and rapid means of production. A multi-layered liner may be made, for example, by coextrusion of the various layers, as is known in the art.

The reinforcement layer, including the number of plys of reinforcement tape, the nature of the tape and the construction, determines, for the most part, many of the operational parameters of the pipe including, for example, burst strength, pressure holding capability, flexibility, etc. For example, the number of tape plys can be selected to determine the pressure class of the pipe, with fewer plys offering a lower pressure holding pipe.

Generally there are at least two plys of tape in the reinforcing layer of the pipe, the plys of reinforcing tape are configured with one ply wound in a positive or clock-wise helical direction and the other ply wound in a negative or counter-clockwise helical direction. One or more further plys of reinforcing tape may be applied between the inner liner and the outer jacket. Generally, as shown, further plys of reinforcing tape are added in pairs with one of the pair of plys wrapped in a positive helical direction and the other of the pair of plys wrapped in a negative helical direction. In a four ply pipe, as shown for example, plys 16, 18, 22, 24 of reinforcing tape are configured with two plys wound in a positive or clock-wise helical direction and the other two plys wound in a negative or counter-clockwise helical direction. The plys generally alternate in their winding direction from inside to outside. A ply is one or more substantially continuous lengths of tape wound at the same angle and direction onto the underlying liner or tape ply.

The tape employed to form the plys can be configured in various ways from pipe to pipe and from ply to ply. In an embodiment, a tape may be used such as that described above with reference to FIG. 3.

The angle of winding of each ply 16, 18 is selected to maximize strength in the circumferential and axial directions. Winding angles of between about 8° and 86° can be used. In one embodiment, winding angles of between 40° and 70° are used, in one embodiment with winding angles of between 50° and 60°. In one embodiment, the plys of each pair are selected to have substantially equal load carrying capability. For example, the first and second plys can use similar tape, have substantially equal but opposite winding angles and be applied in substantially equal quantities.

Outer jacket 20 surrounds the reinforcement layer including plys 16 and 18, and in this embodiment plys 22 and 24, of tape. While the pipe will function to contain pressurized fluids without the outer jacket, outer jacket 20 operates with the couplings disclosed herein to provide pipe connections. Outer jacket 20 also acts to protect the reinforcement layer from damage, as by cut, abrasion, and impact.

The outer jacket is formed of thermoplastic, which is flexible, protects the reinforcing fibers to some degree and is capable of fusing to the underlying layer of the pipe.

As will be appreciated with consideration as to the intended use of the pipe, outer jacket 20 can be selected to be substantially resistant to degradation by environmental effects (i.e. ultraviolet light, weather, etc.) and by the chemicals that may come in contact with it. Currently, the thermoplastic of greatest interest is polyethylene, for example, HDPE.

As desired, the outer jacket can include or have attached thereto identifiers such as, for example, paint, coloration, bar-coding, chips, etc. or materials facilitating use or installation such as, for example, electrically conductive wire or survey locatable metal parts.

Outer jacket 20 may be coated with insulation, if desired, for thermal insulation of environmental temperature to conduit temperature. Insulation may include polymers, foaming agents, etc. If the insulation is not a thermoplastic and/or not bonded to the underlying layers, it should be removed from the pipe's end before being employed in a connection as described herein.

Jacket 20 may be applied to the pipe in various ways. For example, the jacket materials can be applied as by extrusion, spraying, dipping, tape winding, shrink wrapping, braiding, etc. In one embodiment, the jacket is extruded onto the pipe. In another embodiment, a tape can be employed such as a HDPE tape, for example a neat (i.e. non-reinforced) or a low fiber content reinforced HDPE tape. The tape can be wound and bonded about the reinforcement layer using a tape placement method.

It will be apparent that many other changes may be made to the illustrative embodiments, while falling within the scope of the invention and it is intended that all such changes be covered by the claims appended hereto.

We claim:

1. A pipe coupling for forming a pipe connection, the pipe coupling comprising: a wall formed as a tube having open ends and an axis extending between the open ends and having a tubular laminate construction including a liner with an inner surface defining an inner diameter, a reinforcement layer outwardly of the liner, the reinforcement layer including at least one axially extending ply of reinforcing fibers with reinforcing fibers extending at an angle of less than 20° off the axis and at least one hoop wound ply of fibers with reinforcing fibers extending at an angle of greater than 70° relative to the axis and an outer jacket encircling the reinforcement layer and defining an outer surface of the pipe coupling; an electrical conductor supported by the liner and extending about a circumference of the coupling; and a pair of contacts exposed on the outer surface and electrically in contact with the electrical conductor for connecting an electrical power source to the electrical conductor, wherein the at least one axially extending ply of reinforcing fibers and the hoop wound ply of reinforcing fibers each are formed from a tape with the reinforcing fibers extending along a length of the tape.

2. The pipe coupling of claim 1 having an operating pressure range of from 50 to 103 bar.

3. The pipe coupling of claim 1 wherein the liner, the reinforcement layer and the outer jacket each contain a thermoplastic.

4. The pipe coupling of claim 3 wherein the thermoplastic has at least one of the following characteristics: (i) a softening temperature greater than 100° C., (ii) a brittleness temperature less than −60° C., (iii) a melt temperature of 120 to 300° C., (iv) a tensile strength of 16 to 100 MPa, (v) an elongation to break of at least 50%, (vi) resistance to fatigue cracking when subjected to 1 million cycles at 1% strain, and (vii) a notched IZOD impact strength greater than 30 J/m.

5. The pipe coupling of claim 4 wherein the thermoplastic has all of (i) to (vii) and the liner, the reinforcement layer and the outer jacket are fused together in the wall.

6. The pipe coupling of claim 4 wherein the thermoplastic is selected from a polyimide, a polyethylene and a polypropylene.

7. The pipe coupling of claim 1 wherein the electrical conductor is embedded in the liner.

8. The pipe coupling of claim 1 wherein the hoop wound ply of reinforcing fibers has fibers extending at an angle of between 85 and 90° relative to the axis.

9. The pipe coupling of claim 1 wherein the at least one axially extending ply of reinforcing fibers includes at least one ply extending in a positive helical direction and at least one ply extending in a negative helical direction.

10. The pipe coupling of claim 1 wherein the tape includes reinforcing fibers of glass in a matrix including thermoplastic.

11. The flexible pipe connection system of claim 1 wherein the liner, the reinforcement layer and the jacket each contain a thermoplastic.

12. The flexible pipe connection system of claim 11 wherein the thermoplastic has at least one of the following characteristics: (i) a softening temperature greater than 100° C., (ii) a brittleness temperature less than −60° C., (iii) a melt temperature of 120 to 300° C., (iv) a tensile strength of 16 to 100 MPa, (v) an elongation to break of at least 50%, (vi) resistance to fatigue cracking when subjected to 1 million cycles at 1% strain, and (vii) a notched IZOD impact strength greater than 30 J/m.

13. The flexible pipe connection system of claim 12 wherein the thermoplastic has all of (i) to (vii) and the liner, the reinforcement layer and the jacket are fused together in the coupling.

14. The flexible pipe connection system of claim 12 wherein the thermoplastic is at least one of a polyamide, a polyethylene and a polypropylene.

15. The flexible pipe connection system of claim 1 wherein the liner supports the electrical conductor.

16. The flexible pipe connection system of claim 15 wherein the electrical conductor is embedded in the liner.

17. The flexible pipe connection system of claim 1 wherein the at least one ply of reinforcing fibers extends substantially axially and/or is wound circumferentially around the coupling.

18. The flexible pipe connection system of claim 1 wherein the at least one ply of reinforcing fibers results from a tape with the reinforcing fibers extending along a length of the tape.

19. The flexible pipe connection system of claim 1 wherein the tape includes reinforcing fibers of glass in a matrix including thermoplastic.

20. A flexible pipe connection system comprising: a pipe having a wall including an inner surface defining an inner diameter of the pipe, an open end through which the inner diameter is accessed, and a thermoplastic outer jacket exposed on an outer surface of the pipe adjacent the open end; and a connection for connecting to the open end of the pipe, the connection including a coupling and an insert, the coupling including an inner wall surface, an outer wall surface and a wall thickness between the inner wall surface and the outer wall surface, the wall thickness having a tubular laminate construction including a liner, a reinforcement layer outwardly of the liner, the reinforcement layer including at least one ply of reinforcing fibers and a jacket encircling the reinforcement layer, an electrical conductor supported by the wall thickness and extending about a circumference of the coupling, a pair of contacts exposed on the outer wall surface and electrically in contact with the electrical conductor for connecting an electrical power source to the electrical conductor and the insert configured as a tube separate from the coupling, the insert including an outer tubular surface and having a rigidity greater than that of the coupling, the system including the insert installed within the inner diameter to internally support the pipe and the coupling installed over the pipe with the electrical conductor overlapping the thermoplastic outer jacket and the inner wall surface fused to the thermoplastic outer jacket by thermoplastic melting of the thermoplastic outer jacket by the electrical conductor.

21. The flexible pipe connection system of claim 20 wherein the connection system provides a maximum operating internal pressure of from 50 to 103 bar.

22. The flexible pipe connection system of claim 20 wherein the insert extends into the inner diameter a distance to radially underlap the electrical conductor.

23. The flexible pipe connection system of claim 20 further comprising a second pipe extending from an end of the coupling opposite the electrical conductor.

24. The flexible pipe connection system of claim 23 wherein the second pipe is secured to the coupling with the inner wall surface fused to a thermoplastic outer jacket of the second pipe by an electrofusion process.

25. A method for connecting a first pipe to a second pipe, the first pipe and the second pipe each having a wall including an inner surface defining an inner diameter, an open end through which the inner diameter is accessed, and a thermoplastic outer jacket exposed on an outer surface of the wall adjacent the open end, the method comprising: inserting an end of the first pipe into a coupling formed as a tube having open ends and an axis extending between the open ends and having a tubular laminate construction and including a liner with an inner wall surface defining an inner diameter between the open ends configured to accommodate the first pipe and the second pipe positioned end to end, a reinforcement layer outwardly of the liner, the reinforcement layer including at least one axially extending ply of reinforcing fibers with fibers extending at an angle of less than 20° off the axis and a hoop wound ply of fibers with fibers extending at an angle of greater than 70° relative to the axis and an outer jacket encircling the reinforcement layer and defining an outer wall surface, an electrical conductor supported by the liner of the coupling and extending about a circumference of the coupling, a pair of contacts exposed on the outer wall surface and electrically in contact with the electrical conductor for connecting an electrical power source to the electrical conductor, positioning the coupling with the electrical conductor overlapping the thermoplastic outer jacket of the first pipe, placing a tubular insert within the inner diameter of the first pipe, the tubular insert separate from the coupling and including an outer tubular surface and the tubular insert being hollow and having a rigidity greater than that of the coupling, the tubular insert configured to internally support the first pipe and to fit within the inner diameter of the coupling with an annular gap between the inner surface and the outer tubular surface in which the first pipe resides, generating an electrical current through the electrical conductor to melt the thermoplastic outer jacket and to fuse the first pipe to the coupling, inserting an end of the second pipe into the annular gap between the coupling and the tubular insert and positioning the second pipe with a gap between the end of the first pipe and the end of the second pipe and with the electrical conductor overlapping the thermoplastic outer jacket of the second pipe, and generating an electrical current through the electrical conductor to melt the thermoplastic outer jacket and to fuse the second pipe to the coupling, the tubular insert having an axial length along the outer tubular surface sufficient to underlap both the electrical conductor and the gap between the ends of the first pipe and the second pipe.

26. The method of claim 25 wherein generating an electrical current to fuse the first pipe to the coupling occurs before shipping and generating an electrical current to fuse the second pipe to the coupling occurs after shipping.

27. The method of claim 25 further comprising testing the integrity of the connection including: accessing an enclosed volume between the first pipe, the insert and the coupling, the enclosed volume sealed by a first seal between the inner surface and the insert and a second seal between the outer surface and the coupling; pressurizing the enclosed volume to a test pressure; and monitoring the test pressure to observe the pressure holding integrity of the first seal and the second seal.

28. The method of claim 25 further comprising installing an external clamp about the coupling before generating the electrical current.

29. A flexible pipe connection system comprising: a pipe having a wall including an inner surface defining an inner diameter of the pipe, an open end through which the inner diameter is accessed, and a thermoplastic outer jacket exposed on an outer surface of the pipe adjacent the open end; and a connection for connecting to the open end of the pipe, the connection including a coupling and an insert, the coupling including an inner wall surface, an outer wall surface and a wall thickness between the inner wall surface and the outer wall surface, the wall thickness has having a tubular laminate construction including a liner with an inner surface defining the inner wall surface, a reinforcement layer outwardly of the liner, the reinforcement layer including at least one axially extending ply of reinforcing fibers with fibers extending at an angle of less than 20° off the axis and a hoop wound ply of reinforcing fibers with fibers extending at an angle of greater than 70° relative to the axis and an outer jacket encircling the reinforcement layer and defining the outer wall surface; and the electrical conductor is embedded in the liner, an electrical conductor supported by the wall thickness and extending about a circumference of the coupling, a pair of contacts exposed on the outer wall surface and electrically in contact with the electrical conductor for connecting an electrical power source to the electrical conductor and the insert configured as a tube separate from the coupling, the insert including an outer tubular surface and having a rigidity greater than that of the coupling, the system including the insert installed within the inner diameter to internally support the pipe and the coupling installed over the pipe with the electrical conductor overlapping the thermoplastic outer jacket and the inner wall surface fused to the thermoplastic outer jacket by thermoplastic melting of the thermoplastic outer jacket by the electrical conductor.

30. The flexible pipe connection system of claim 29 wherein the at least one axially extending ply of reinforcing fibers and the hoop wound ply of reinforcing fibers each are formed from a tape with the fibers extending along a length of the tape and a thermoplastic matrix and the plies are fused together by fusion of the thermoplastic matrix.

31. A pipe connection assembly for connecting an end of a first pipe to an end of a second pipe, the connection comprising:
a coupling including a wall configured as a tube having open ends and an axis extending between the open ends and having a tubular laminate construction including a liner with an inner surface defining an inner diameter between the open ends, a reinforcement layer outwardly of the liner, the reinforcement layer including at least one axially extending ply of reinforcing fibers with fibers extending at an angle of less than 20° off the axis and a hoop wound ply of fibers with fibers extending at an angle of greater than 70° relative to the axis and an outer jacket encircling the reinforcement layer and defining an outer wall surface, an electrical conductor supported by the liner and extending about a circumference of the coupling, a pair of contacts exposed on the outer wall surface and electrically in contact with the electrical conductor for connecting an electrical power source to the electrical conductor, the coupling configured to accommodate the first pipe and the second pipe positioned end to end in the inner diameter; and a tubular insert separate from the coupling and including an outer tubular surface and the tubular insert being hollow and having a rigidity greater than that of the coupling, the tubular insert configured to fit within the inner diameter of the coupling with an annular gap between the inner surface and the outer tubular surface and to internally support the first pipe, the tubular insert having an axial length along the outer tubular surface sufficient to underlap both the electrical conductor and a gap between the ends of the first pipe and the second pipe.

32. The pipe connection assembly of claim 31 wherein the connection system provides a maximum operating internal pressure of from 50 to 103 bar.

33. The pipe connection assembly of claim 31 wherein the liner and the outer jacket each contain a thermoplastic and the at least one axially extending ply of reinforcing fibers and the hoop wound ply of reinforcing fibers each are formed from a tape with the fibers extending along a length of the tape and a matrix containing thermoplastic and the plies, the liner and the outer jacket are fused together by fusion of the thermoplastic.

34. The pipe connection assembly of claim 33 wherein the thermoplastic has: (i) a softening temperature greater than 100° C., (ii) a brittleness temperature less than −60° C., (iii) a melt temperature of 120 to 300° C., (iv) a tensile strength of 16 to 100 MPa, (v) an elongation to break of at least 50%, (vi) resistance to fatigue cracking when subjected to 1 million cycles at 1% strain, and (vii) a notched IZOD impact strength greater than 30 J/m.

35. The pipe connection assembly claim 34 wherein the thermoplastic is at least one of a polyamide, a polyethylene and a polypropylene.

36. The pipe connection assembly claim 31 wherein the hoop wound ply of reinforcing fibers has fibers extending at an angle of between 85 and 90° relative to the axis.

37. The pipe connection assembly of claim 31 wherein the electrical conductor is embedded in the liner.

38. The pipe connection assembly of claim 31 wherein the tubular insert includes annular seals on the outer tubular surface.

39. The pipe connection assembly of claim 31 wherein the tubular insert includes a bore and a first end and an opposite end opening to the bore and wherein the ends have tapered inner diameter surfaces.

40. The pipe connection assembly of claim 39 wherein the tubular insert includes an annular shoulder extending outwardly from the outer tubular surface, against which the ends of the first pipe and second pipe abut.

41. The pipe connection assembly of claim 40 wherein the tubular insert has a first end length between the first end and the annular shoulder and a second end length between the opposite end and the annular shoulder and the first end length is shorter than the second end length.

42. The pipe connection assembly of claim 31 wherein the tubular insert includes surface serrations on the outer tubular surface.

* * * * *